US008364110B2

(12) United States Patent
Chuang et al.

(10) Patent No.: US 8,364,110 B2
(45) Date of Patent: Jan. 29, 2013

(54) RADIO FREQUENCY FRONT END CIRCUIT

(75) Inventors: Mao-Chang Chuang, Taipei Hsien (TW); Chi-Hsin Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 302 days.

(21) Appl. No.: 12/949,808

(22) Filed: Nov. 19, 2010

(65) Prior Publication Data
US 2012/0045006 A1 Feb. 23, 2012

(30) Foreign Application Priority Data

Aug. 20, 2010 (CN) .......................... 2010 1 0258653

(51) Int. Cl.
*H04B 1/10* (2006.01)
(52) U.S. Cl. .......................... 455/296; 455/302; 455/222
(58) Field of Classification Search ............... 455/67.11, 455/67.13, 222, 223, 224, 278.1, 296, 302, 455/220, 226.1, 277.1, 277.2
See application file for complete search history.

(56) References Cited

U.S. PATENT DOCUMENTS

| | | | |
|---|---|---|---|
| 7,899,406 B2 * | 3/2011 | Han et al. ........................ | 455/73 |
| 2005/0164648 A1 * | 7/2005 | Gannholm ....................... | 455/84 |
| 2011/0053539 A1 * | 3/2011 | Sundstrom et al. ........ | 455/226.1 |

* cited by examiner

*Primary Examiner* — Ping Hsieh
(74) *Attorney, Agent, or Firm* — Altis Law Group, Inc.

(57) ABSTRACT

A RF front end circuit includes a processor, a main receiving (Rx) path and an adjustment path connected between the processor and an external antenna array in parallel, and a coupling module coupled with the main Rx path. The adjustment path includes an adjustment transmitting (Tx) path, an adjustment Rx path, and a DSP. The adjustment Tx path includes a coupling switch. When the circuit operates in an adjustment mode, the switch is connected to the coupling module, the adjustment Rx path receives and demodulates a first analog signal, the DSP converts the first analog signal to a digital signal, clipping a peak of the digital signal, and converts the digital signal to a second analog signal, the adjustment Tx path modulates and reverses the phase of the second analog signal, and the coupling module couples the second analog signal to the main Rx path to counteract noise received thereby.

20 Claims, 3 Drawing Sheets (a)

(b)

(c)

(d)

(e)

(f)

RADIO FREQUENCY FRONT END CIRCUIT

BACKGROUND

1. Technical Field

The present disclosure relates to Multi-Input, Multi-Output systems (MIMOs), and, particularly, to a radio frequency front end circuit used in a MIMO.

2. Description of Related Art

MIMOs are widely used in wireless communication systems. An MIMO usually includes a radio frequency (RF) front end circuit and an antenna array connected to the radio frequency front end circuit. Signals received by the MIMO usually include communication signals and noise in the environment, such as narrow band interference and jamming noise. The noise must be suppressed or communication quality can be affected.

One noise suppression solution adds an extra noise suppression circuit to each receiving (Rx) path of the RF front end circuit. The noise suppression circuit at least includes a detector and a filter. However, the cost of the MIMO is increased.

Thus, what is needed is a RF front end circuit that can overcome the described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
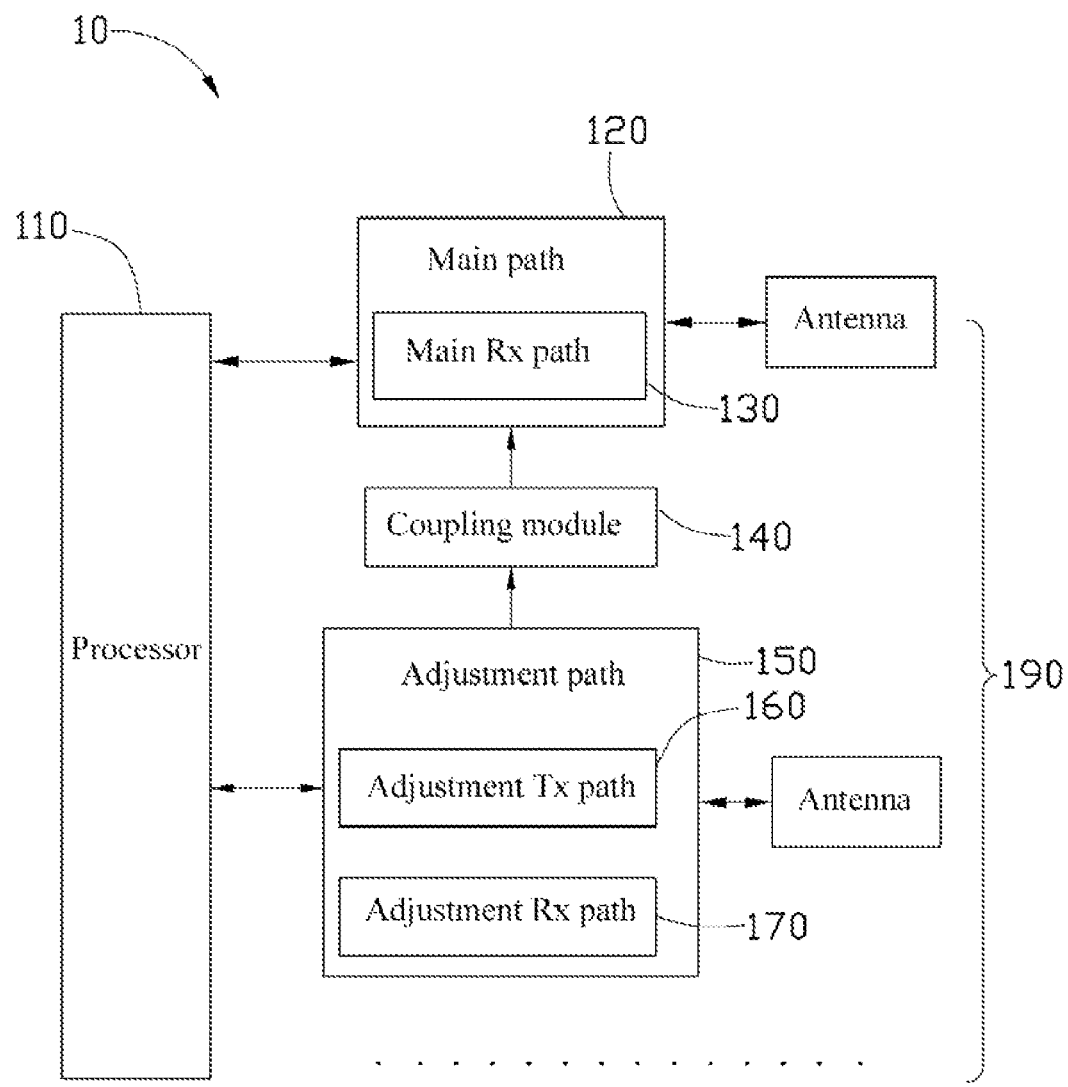
FIG. 1 illustrates a system architecture of a RF front end circuit, according to an exemplary embodiment.
Figure 2:
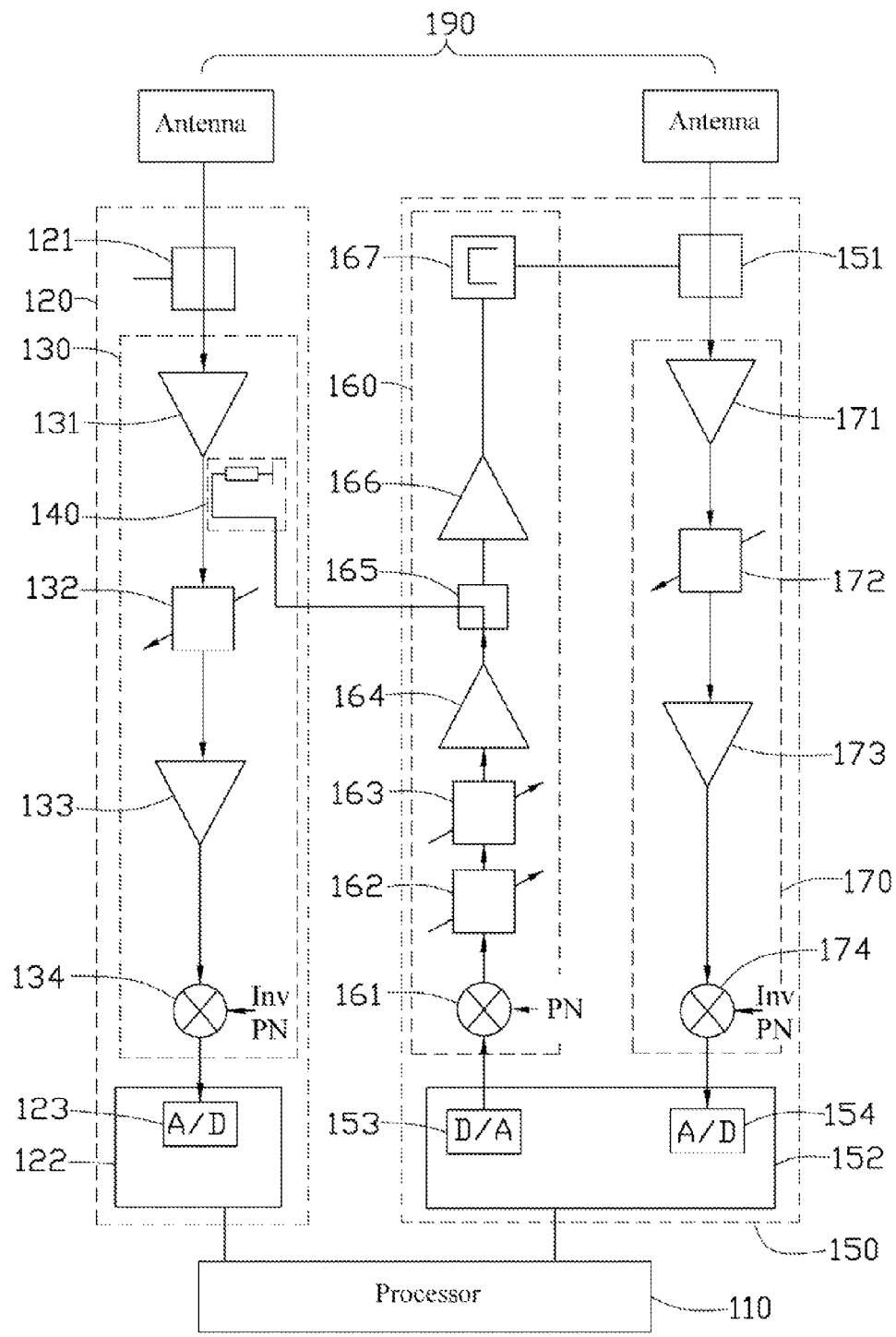
FIG. 2 is a circuit diagram of the RF front end circuit of FIG. 1.

Referring to FIGS. 1 and 2, a RF front end circuit 10 according to an exemplary embodiment is connected to an antenna array 190. The RF front end circuit 10 transmits signals and receives signals via the antenna array 190.

The RF front end circuit 10 includes a processor 110, at least one main path 120, at least one adjustment path 150, and at least one coupling module 140. In the following description, for simplicity, it will be assumed that there is only one main path 120, only one adjustment path 150, and only one coupling module 140. The main path 120 and the adjustment path 150 are connected in parallel between the processor 110 and the antenna array 190. The main path 120 is connected to a first antenna of the antenna array 190, while the adjustment path 150 is connected to a second antenna of the antenna array 190. The main path 120 includes a main receiving (Rx) path 130. The adjustment path 150 includes an adjustment transmitting (Tx) path 160 and an adjustment Rx path 170. The adjustment Tx path 160 includes a coupling switch 165. A first end of the coupling module 140 is coupled with the main path 120, and a second end of the coupling module 140 is connected to the coupling switch 165 of the adjustment path 150.

The processor 110 is configured for processing signals to be transmitted or received, and shifting working modes of the RF front end circuit 10. The RF front end circuit 10 includes a normal mode and an adjustment mode. In the normal mode, the processor 110 directs the coupling switch 165 to switch off the connection between the coupling module 140 and the adjustment path 150, such that the main path 120 and the adjustment path 150 independently receive and transmit signals between the processor 110 and the antenna array 190. In the adjustment mode, the processor 110 directs the coupling switch 165 to switch on the connection between the coupling module 140 and the adjustment path 150, the adjustment path 150 produces an adjustment signal according to a signal received by the antenna array 190 and transmits the adjustment signal to the coupling module 140, and the coupling module 140 couples the adjustment signal to the main path 120 in order to eliminate noise received by the main path 120.

When the RF front end circuit 10 works in normal mode, the RF front end circuit 10 has a rapid communication rate. However, the communication rate decreases when noise occurs, as the noise occupies the main path 120 and the adjustment path 150 and blocks the communication signals. When the RF front end circuit 10 works in the adjustment mode, the RF front end circuit 10 has a limited but stable communication rate, as the noise has been suppressed and the main path 120 is open for the communication signals. The processor 110 can shift the working modes according to an instruction input by a user, or according to a communication parameter. For example, if the RF front end circuit 10 is working in the normal mode and the communication rate is lower than a preferred rate because of powerful noise, the processor 110 directs the RF front end circuit 10 to switch to the adjustment mode.

In order from the antenna array 190 to the processor 110, the main Rx path 130 includes a main low-noise amplifier (LNA) 131, a main attenuator 132, a main intermediate frequency amplifier (IFA) 133, and a main synthesizer 134 connected in series.

The main LNA 131 is configured for amplifying signals received and transmitted by the antenna array 190. The main attenuator 132 is configured for reducing amplitudes of the signals if the amplitudes are too high. The main IFA 133 is configured for further amplifying the signals after processing by the main attenuator 132. The main synthesizer 134 is configured for demodulating the signals according to a demodulation signal inv PN(t). The demodulation signal inv PN(t) can be input from the processor 110, or from a hardware circuit (not shown) controlled by the processor 110.

The main path 120 further includes a main switch 121 connected between the main Rx path 130 and the first antenna, and a main Digital Signal Processing module (DSP) 122 connected between the main Rx path 130 and the processor 110. The main switch 121 is controlled by the processor 110. The main switch 121 is used to connect the first antenna to the main Rx path 130, or to a main Tx path (not shown) connected in parallel with the main Rx path 130. The main DSP 122 includes a main analog-to-digital converter (ADC) 123 connected to the main synthesizer 134. The ADC 123 is used for converting the signals from analog to digital form. The DSP 122 is used for processing the digital signals initially, and then transmitting the signals to the processor 110 for further processing.

The adjustment path 150 includes an adjustment switch 151 connected to the second antenna, an adjustment DSP 152 connected to the processor 110, and the adjustment Tx path 160 and the adjustment Rx path 170 connected in parallel between the adjustment switch 151 and the adjustment DSP 152. The adjustment switch 151 is controlled by the processor 110. The adjustment switch 151 is used to connect the second antenna to the adjustment Tx path 160 or to the adjustment Rx path 170. The adjustment DSP 152 includes an adjustment digital-to-analog converter (DAC) 153 connected to the adjustment Tx path 160, and an adjustment ADC 154 connected to the adjustment Rx path 170.

In order from the adjustment switch 151 to the adjustment DSP 152, the adjustment Rx path 170 includes an adjustment LNA 171, an adjustment attenuator 172, an adjustment IFA 173, and a first synthesizer 174, which are connected in series and have the same functions as the corresponding components of the main Rx path 130.

In order from the adjustment DSP 152 to the adjustment switch 151, the adjustment Tx path 160 includes a second synthesizer 161, a phase shifter 162, an attenuator 163, a linear amplifier 164, the coupling switch 165, a power amplifier 166, and a filter 167 connected in series. The second synthesizer 161 is configured for receiving signals from the adjustment DSP 152 and modulating the signals according to a modulation signal PN(t). The modulation signal PN(t) is an inverse signal of the demodulation signal inv PN(t), and can be input from the processor 110 or from a hardware circuit controlled by the processor 110. The phase shifter 162 is configured for adjusting phases of the signals. The linear amplifier 164 and the power amplifier 166 are configured for amplifying the signals in turn. The filter 167 is configured for filtering distortion components of the signals.

The coupling module 140 is coupled to circuitry between the main LNA 131 and the main attenuator 132. The coupling module 140 includes a coupler and a resistor connected in series. The coupling switch 165 is controlled by the processor 110 to selectively connect the linear amplifier 164 to the power amplifier 166 when the RF front end circuit 10 is working in the normal mode, or connect the liner amplifier 164 to the coupling module 140 when the RF front end circuit 10 is working in the adjustment mode.

While a detailed description of the adjustment mode is given below, it should be pointed out that a detailed description of the normal mode is omitted, as it is the same as a conventional working mode of a RF front end circuit.

Figure 3:
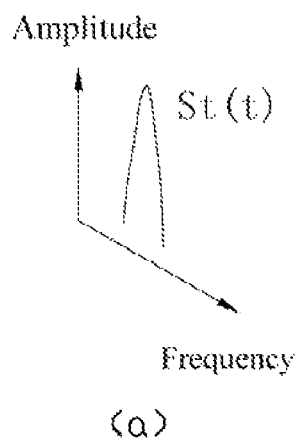
FIG. 3 illustrates signals processed by the RF front end circuit of FIG. 1.
Figure 3:
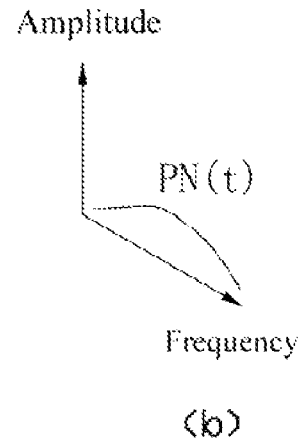
Figure 3:
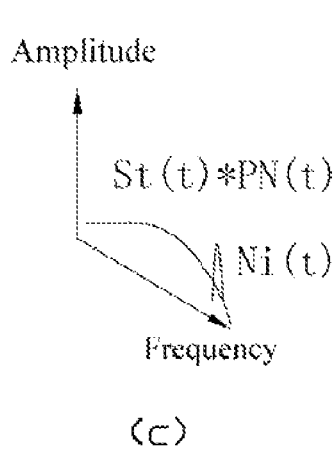
Figure 3:
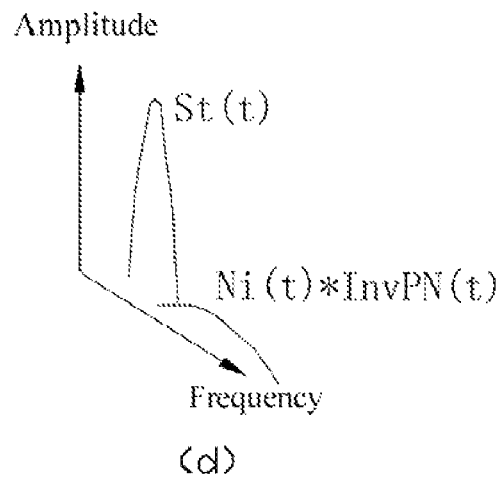
Figure 3:
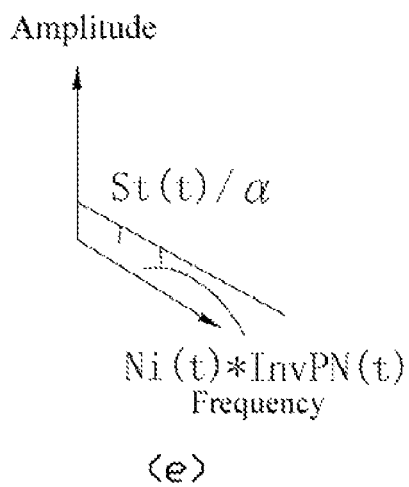
Figure 3:
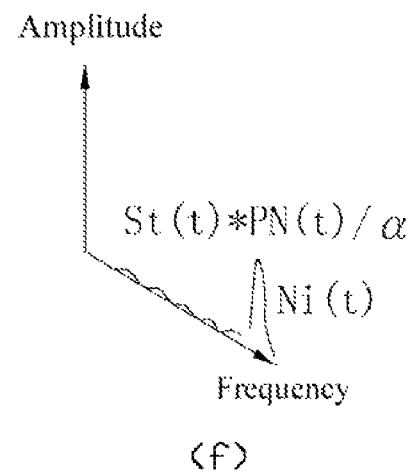

FIG. 3(a) shows a useful signal St(t), and FIG. 3(b) shows a modulation signal PN(t). In a remote transmission device (not shown), the useful signal St(t) and the modulation signal PN(t) are synthesized to a communication signal St(t)*PN(t) and transmitted. The antenna array 190 receives the communication signal St(t)*PN(t) and Noise Ni(t) in the environment (shown in FIG. 3(c)), and transmit them to the main Rx path 130 and the adjustment Rx path 170 respectively. Yet, the noise Ni(t) must be removed to improve the communication quality.

In the adjustment Rx path 170, the signal St(t)*PN(t)+Ni(t) is sequentially processed by the adjustment LNA 171, the adjustment attenuator 172, and the IFA 173. Then the signal St(t)*PN(t)+Ni(t) is sent to the first synthesizer 174. The first synthesizer 174 receives and combines the signal St(t)*PN(t)+Ni(t) and the demodulation signal inv PN(t), to acquire a signal St(t)+Ni(t)*Inv PN(t) (shown in FIG. 3(d)). The amplitude of the signal St(t) exceeds that of the signal Ni(t)*Inv PN(t), thus the PAPR value (Peak to Average Power Ratio value) $\alpha$ of the signal St(t)+Ni(t)*Inv PN(t) exceeds 1.

The signal St(t)+Ni(t)*Inv PN(t) is sent to the adjustment ADC 154 and is converted from analog to digital. The adjustment DSP 152 clips a peak of the digital signal St(t)+Ni(t)*Inv PN(t), to acquire a signal St(t)/$\alpha$+Ni(t)*Inv PN(t) (shown in FIG. 3(e)). The peak clipping method can be any of various desired methods. One peak clipping method, for example, is dividing the signal St(t)+Ni(t)*Inv PN(t) into an amplitude component and a frequency component by a FFT (Fast Fourier Transform) method, then limiting the amplitude of the amplitude component, and finally combining the amplitude component and the frequency component by an IFFT (Inverse Fast Fourier Transform) method. This amplitude limit method sets a threshold value according to the PAPR value $\alpha$, compares the amplitude of the amplitude component with the threshold value, and reduces the amplitude to the threshold value if the amplitude exceeds the threshold value. After the peak clipping process, the signal Ni(t)*Inv PN(t) remains unchanged, and the signal St(t) is reduced to St(t)/$\alpha$.

The signal St(t)/$\alpha$+Ni(t)*Inv PN(t) is sent to the adjustment DAC 153 and is converted from digital to analog. Then the signal St(t)/$\alpha$+Ni(t)*Inv PN(t) is sent to the second synthesizer 161. The second synthesizer 161 receives and combines the signal St(t)/$\alpha$+Ni(t)*Inv PN(t) and the modulation signal PN(t), to acquire a signal St(t)*PN(t)/$\alpha$+Ni(t) (shown in FIG. 3(f)). The signal St(t)*PN(t)/$\alpha$ is weak, and thus, the signal St(t)*PN(t)/$\alpha$+Ni(t) nearly equals the noise signal Ni(t). The phase shifter 162 reverses the phase of the signal St(t)*PN(t)/$\alpha$+Ni(t), to acquire a signal $-$St(t)*PN(t)/$\alpha$$-$Ni(t). Then the signal $-$St(t)*PN(t)/$\alpha$$-$Ni(t) is processed by the attenuator 163 and the linear amplifier 164. Finally, the signal $-$St(t)*PN(t)/$\alpha$$-$Ni(t) is coupled to the main Rx path 130 by the coupling module 140 to counteract the noise Ni(t) received by the main Rx path 130. In this way, the noise Ni(t) is substantially removed and the communication quality improved.

In other embodiments, there may be plural main paths 120, adjustment paths 150, and coupling modules 140. In each group of one main path 120, one adjustment path 150, and one coupling module 140, the main path 120 is connected to a respective antenna of the antenna array 190, and the adjustment path 150 is connected to another respective antenna of the antenna array 190.

It will be further understood that the above particular embodiments are shown and described by way of illustration only. The principles and the features of the present disclosure may be employed in various and numerous embodiments thereof without departing from the scope and spirit of the claims. The above-described embodiments illustrate the scope of the disclosure but do not restrict the scope of the disclosure.

What is claimed is:

1. A radio frequency (RF) front end circuit connected to an external antenna array, the RF front end circuit comprising:
   a processor;
   a main receiving (Rx) path and an adjustment path connected between the processor and the external antenna array in parallel, the adjustment path comprising an adjustment transmitting (Tx) path, an adjustment Rx path, and a digital signal processing module (DSP), the adjustment Tx path comprising a coupling switch; and
   a coupling module with a first end coupled to the main Rx path, and a second end connected to the coupling switch;
   wherein
   the RF front end circuit is selectively operable in a normal mode or an adjustment mode under control of the processor;
   when the RF front end circuit operates in the normal mode, the main Rx path and the adjustment Rx path respectively receive and process signals from the external antenna array independently; and
   when the RF front end circuit operates in the adjustment mode, the processor directs the coupling switch to connect the coupling module to the adjustment Tx path, the adjustment Rx path receives and demodulates a first analog signal from the antenna array, and transmits the first analog signal to the DSP, the DSP converts the first analog signal to a digital signal, clips a peak part of the digital signal, converts the digital signal to a second analog signal, and transmits the second analog signal to the adjustment Tx path, the adjustment Tx path modulates and reverses the phase of the second analog signal, and transmits the second analog signal to the coupling module, and the coupling module couples the second analog signal to the main Rx path to counteract a noise received by the main Rx path.

2. The RF front end circuit of claim 1, wherein the DSP clips a peak of the digital signal by firstly dividing the digital signal into an amplitude component and a frequency component by a fast Fourier transform (FFT) method, then limiting the amplitude of the amplitude component, and finally combining the amplitude component and the frequency component by an inverse fast Fourier transform (IFFT) method.

3. The RF front end circuit of claim 2, wherein the DSP limits the amplitude of the amplitude component by setting a threshold value, comparing the amplitude of the amplitude component with the threshold value, and reducing the amplitude to the threshold value if the amplitude exceeds the threshold value.

4. The RF front end circuit of claim 1, wherein the DSP comprises an analog to digital converter (ADC) connected to the adjustment Rx path and a digital to analog converter (DAC) connected to the adjustment Tx path.

5. The RF front end circuit of claim 1, wherein the adjustment Rx path comprises a first synthesizer configured for demodulating the first analog signal.

6. The RF front end circuit of claim 1, wherein the adjustment Tx path comprises a second synthesizer configured for modulating the second analog signal.

7. The RF front end circuit of claim 1, wherein the adjustment Tx path comprises a phase shifter configured for reversing the phase of the second analog signal.

8. The RF front end circuit of claim 1, wherein the coupling module comprises a coupler and a resistor connected in series.

9. The RF front end circuit of claim 1, wherein the processor directs the RF front end circuit to operate in the normal mode or in the adjustment mode according to an instruction input by a user.

10. The RF front end circuit of claim 1, wherein the processor automatically directs the RF front end circuit to operate in the normal mode or in the adjustment mode according to a communication rate of the RF front end circuit.

11. A radio frequency (RF) front end circuit for connection to an external antenna array, the RF front end circuit comprising:
a processor;
a main receiving (Rx) path and an adjustment path connected to the processor, and capable of connection to the external antenna array in parallel, the adjustment path comprising an adjustment transmitting (Tx) path, an adjustment Rx path, and a digital signal processing module (DSP), the adjustment Tx path comprising a coupling switch; and
a coupling module with a first end coupled to the main Rx path, and a second end connected to the coupling switch; wherein the RF front end circuit is selectively operable in a normal mode or an adjustment mode under control of the processor;
when the RF front end circuit operates in the normal mode, the main Rx path and the adjustment Rx path are capable of respectively receiving and processing signals from the external antenna array independently; and
when the RF front end circuit operates in the adjustment mode, the processor directs the coupling switch to connect the coupling module to the adjustment Tx path, the adjustment Rx path is capable of receiving and demodulating a first analog signal from the antenna array, and transmitting the first analog signal to the DSP, the DSP converts the first analog signal to a digital signal, clips a peak part of the digital signal, converts the digital signal to a second analog signal, and transmits the second analog signal to the adjustment Tx path, the adjustment Tx path modulates and reverses the phase of the second analog signal, and transmits the second analog signal to the coupling module, and the coupling module couples the second analog signal to the main Rx path to counteract a noise received by the main Rx path.

12. The RF front end circuit of claim 11, wherein the DSP clips a peak of the digital signal by firstly dividing the digital signal into an amplitude component and a frequency component by a fast Fourier transform (FFT) method, then limiting the amplitude of the amplitude component, and finally combining the amplitude component and the frequency component by an inverse fast Fourier transform (IFFT) method.

13. The RF front end circuit of claim 12, wherein the DSP limits the amplitude of the amplitude component by setting a threshold value, comparing the amplitude of the amplitude component with the threshold value, and reducing the amplitude to the threshold value if the amplitude exceeds the threshold value.

14. The RF front end circuit of claim 11, wherein the DSP comprises an analog to digital converter (ADC) connected to the adjustment Rx path and a digital to analog converter (DAC) connected to the adjustment Tx path.

15. The RF front end circuit of claim 11, wherein the adjustment Rx path comprises a first synthesizer configured for demodulating the first analog signal.

16. The RF front end circuit of claim 11, wherein the adjustment Tx path comprises a second synthesizer configured for modulating the second analog signal.

17. The RF front end circuit of claim 11, wherein the adjustment Tx path comprises a phase shifter configured for reversing the phase of the second analog signal.

18. The RF front end circuit of claim 11, wherein the coupling module comprises a coupler and a resistor connected in series.

19. The RF front end circuit of claim 11, wherein the processor directs the RF front end circuit to operate in the normal mode or in the adjustment mode according to an instruction input by a user.

20. The RF front end circuit of claim 11, wherein the processor automatically directs the RF front end circuit to operate in the normal mode or in the adjustment mode according to a communication rate of the RF front end circuit.

* * * * *